United States Patent Office 3,029,024
Patented Apr. 10, 1962

3,029,024
CHECKING SYSTEM
Cornelis A. S. Hamelink, Van Stolbergweg 6,
Zandvoort, Netherlands
Filed Apr. 9, 1957, Ser. No. 651,612
Claims priority, application Great Britain Apr. 11, 1956
5 Claims. (Cl. 235—153)

The invention relates to a device for determining check symbols for symbol groups and for checking symbol groups already provided with check symbols, and more in particular to a device of this kind which is adapted to be used in combination with machines for recording and processing numerical as well as alphabetical or alphanumerical symbol groups.

It is known to protect symbol groups against errors by appending to each symbol group a check symbol derived from the symbols of the group by means of a predetermined arithmetical rule. The most frequent errors occurring in symbol groups are the "one symbol error," whereby a wrong symbol appears in one position of the group, and the "transposition error," whereby two adjacent symbols are interchanged. The said arithmetical rule should be devised in such manner that these two errors always lead to a change of the check symbol pertaining to the group. Thus, by determining the check symbol of a received symbol group, and by comparing this check symbol with the check symbol appended to the group, the said most frequent errors will be detected with certainty, whereas errors of other kinds will be detected with a very large probability, so that more than 99% of all existing errors are discovered in practice.

If the symbol groups contain other symbols than digits, a certain numerical value must be assigned to each of these other symbols, in order that the said arithmetical rule may be applied to the symbols of each group.

For symbol groups exclusively consisting of digits, i.e. numerical symbol groups or numbers, it is preferred to devise the said arithmetical rule in such manner that the check symbols are "arithmetically consistent," i.e. that the check symbol of the result of an arithmetical operation applied to certain numbers may be found by performing a similar arithmetical operation on the check symbols of these numbers. Of course, where letters or other non-numerical symbols are used as check symbols, each check symbol is supposed to have a certain arithmetical value for this purpose.

A very useful rule to find an arithmetically consistent check symbol for a number is as follows: Divide the number by a given key value N and represent the remainder obtained in this division by a suitable symbol. The key value N is preferably a prime number somewhat greater than 10, such as 11, 13, 17 or 19. In general, 13 is considered to be the most suitable key value, although other values such as 11 or 17 might be used as well. It cannot be recommended, however, to use a key value much greater than 10 for numerical groups, as the costs of the checking devices increase with increasing key values. For instance, key values such as 31 or 37 might be considered as unsuitable for numerical groups from the point of view of costs.

Assuming 13 to be the key value, the procedure is as follows. The number 45, when divided by the key value 13, yields a remainder 6. Thus, the check symbol of the number 45 must represent the value 6. Upon division of the number 64 by the key value 13, we find a remainder 12, so that the check symbol of the number 64 must represent the value 12. As thirteeen different values have to be represented, it is preferred to use letters as check symbols. For instance, a remainder 1 may be represented by the letter A, a remainder 2 by the letter B, and so on. In this case, the number 45 will have the check symbol F and the number 64 the check symbol L. We append these check symbols to the numbers and write 45–F and 64–L. Of course, the order in which the remainders are represented by letters is quite arbitrary.

Now, if we want to determine the check symbol of the sum $45 + 64 = 109$, we add together the numerical values 6 and 12 of the check symbols F and L, and find the sum 18, which yields a remainder 5 upon division by 13, so that the letter E, representing a remainder 5, will be the check symbol of the sum 109. Of course, the remainder 5 is also found if 109 is divided by 13, which means that the system is arithmetically consistent.

It may easily be proved that the check symbol of each of the numbers 45 and 64 is altered if one of the digits is changed or if the two digits are interchanged. In fact, if we apply the above-described 13-system to larger numbers, we find that it reveals all one symbol errors and all transpositions within a sequence of six consecutive digits.

In order to check a number accompanied by a check symbol, the number and its check symbol are entered in a checking device, which is constructed in such manner that it assumes a predetermined check position if the proper check symbol is entered after the number. If either the number or the check symbol is wrong, the device does not assume its check position. In general, the check position is the zero position of the device.

There are several types of punched card machines, accounting machines and the like which are adapted to record and to process alphabetical and alpha-numerical groups as well as numbers. If it is desired to check these groups by means of check symbols, this may be done by using a system similar to the above-described 13-system, but based on a larger key value, such as 37 or 41 (the key value must be at least equal to the number of different symbols used).

However, it is generally of more importance to check the numerical symbol groups than the alphabetical and alpha-numerical groups, so that it may be expected that there will be many users of machines of the above-mentioned kinds who want a check on the numerical groups, but are not interested in a check on the alphabetical and alpha-numerical groups. It would, of course, be an advantage to have standardised equipment suitable for checking numerical groups as well as alphabetical and alpha-numerical groups, but it would be uneconomical to base this equipment on a large prime number as a key value, such as 37 or 41, as such a key value would be much too large for the numerical groups, so that the equipment would be too expensive for users who want a check on numerical groups only.

It is an object of the invention to provide a device for determining check symbols for symbol groups and for checking symbol groups already provided with check symbols which may be used for checking numerical symbol groups on the base of a relatively small key value, such as 11, 13 or 17, but which may also provide a reliable check on alphabetical and alpha-numerical groups by means of some additional equipment to be provided only to those users who want such a check.

It is another object of the invention to provide a checking device for numerical, alphabetical and alpha-numerical symbol groups adapted to operate on each kind of symbol group without any change in the circuit, so that the operator need not strike any special key to indicate the kind of symbol group to be handled.

It is a further object of the invention to provide a checking device for numerical, alphabetical and alpha-numerical symbol groups which may be added to any existing machine for processing groups of these kinds without any other change in the machine than the addition of one contact to each of the keys.

Further objects of the invention will appear from the following detailed description thereof.

According to the invention, numerical symbol groups are checked on the base of a relatively small key value, such as 11, 13, or 17, and alphabetical and alpha-numerical symbol groups are checked on the base of a multiple of this key value. If the key value for numerical groups is N, the key value for alphabetical and alpha-numerical groups will be $M \cdot N$, wherein M is a relatively small prime number, such as 5 or 7.

Numerical symbol groups are provided with one check symbol, representing the remainder obtained on division of the group by N. Alphabetical and alpha-numerical groups are provided with two check symbols, one representing the remainder obtained on division of the number formed by the numerical values by N, and the other representing the remainder obtained on division of said number by M. For this purpose, the device according to the invention comprises two check symbol computers, one based on the key value N, and the other on the key value M. When a certain symbol is entered into the device, the remainder obtained on division by N of the numerical value assigned to this symbol is supplied to the N-computer, and the remainder obtained on division by M of said numerical value is supplied to the M-computer. The computers are constructed in such manner that they compute the remainder on division by M, or N respectively, of the number formed by the values that are successively supplied to the computer. For instance, if the values $q_1$, $q_2$, $q_3$ and $q_4$ are successively supplied to the N-computer, this computer determines the remainder on division by N of the number $q_1$, $q_2$, $q_3$, $q_4$, i.e. of the number $(1000q_1+100q_2+10q_3+q_4)$. After all symbols of the symbol group have been entered, the N-computer occupies a position representing one of the check symbols of the group, and the M-computer occupies a position representing the other check symbol. Hereinafter, the check symbol represented by the N-computer will be indicated as the first check symbol, and the check symbol represented by the M-computer as the second check symbol, although the order of the check symbols may be reversed in some instances, as will be explained hereinafter.

In order that the device may be designed as simply as possible, it is preferred to assign numerical values to the digits and letters according to the following system.

The numerical values assigned to the digits are chosen in such manner that the remainder on division by N corresponds with the arithmetical value of each digit.

Numerical values according to the formula $aM+b$, wherein $a$ may have any value from 0 to $(N-1)$ and wherein $b$ is a constant, are assigned to a first series of N letters. These N letters are used as check symbols for numerical groups, and as first check symbols for alphabetical and alpha-numerical groups.

Numerical values according to the formula $cN+d$, wherein $c$ may have any value from 0 to $(M-1)$, and wherein $d$ is a constant are assigned to a second series of M letters. These M letters are used as second check symbols for alphabetical and alpha-numerical groups.

The two letter series have one letter in common.

The numerical values assigned to the remaining letters, and to any other symbols that might be used, are quite arbitrary. Of course, they must be smaller than MN, and they may not already have been used for the digits or for the letters of the said two series.

By choosing the numerical values of the digits and letters in the above-described manner, it is possible to bring both check computers into a predetermined check position by entering a symbol group and the associated check symbol or symbols. This check position may be the zero position of the computer, but it may also be a different position.

The invention will be more fully explained by reference to the following numerical examples. In these examples, it is assumed that $N=13$, and $M=7$. This combination of check values is very suitable, since it allows for a full protection against all one symbol errors and transpositions within a sequence of six symbols, no matter whether these symbols are letters or digits. The effective key value of the checking system is 91, so that each letter and each digit must have a numerical value between 0 and 90.

EXAMPLE I

Numerical values are assigned to the digits, letters and auxiliary symbols in the following manner:

| Digits | 0 | 1 | 2 | 3 | 4 | 5 | 6 | 7 | 8 | 9 | | |
|---|---|---|---|---|---|---|---|---|---|---|---|---|
| Numerical values | 0 | 14 | 28 | 42 | 56 | 70 | 84 | 7 | 21 | 35 | | |
| Letters (I) | A | D | G | J | M | P | S | V | Y | W | Z | E | X |
| Numerical values | 79 | 2 | 16 | 30 | 44 | 58 | 72 | 86 | 9 | 23 | 37 | 51 | 65 |

| Letters (II) | B | E | H | K | N | Q | T |
|---|---|---|---|---|---|---|---|
| Numerical values | 64 | 51 | 38 | 25 | 12 | 90 | 77 |

| Other symbols | C | F | I | L | O | R | U | AS1 | AS2 |
|---|---|---|---|---|---|---|---|---|---|
| Numerical values | 1 | 15 | 29 | 43 | 57 | 71 | 85 | 49 | 63 |

It will be seen that the numerical values of the digits are whole multiples of 7, and that the remainder obtained on division by 13 of each of these numerical values corresponds with the arithmetical value of the digit in question. Thus, whenever a digit is entered into the device, the arithmetical value of this digit is supplied to the 13-computer, which calculates a check symbol based on the key value 13 in the usual manner, whereas the value zero is supplied to the 7-computer.

The numerical values of the letters of the first group have been chosen according to the formula $7a+2$, wherein $a$ may have any value between 0 and 12, i.e. each of these values yields a remainder 2 on division by 7. These letters are used as check symbols for numerical groups and as first check symbols for alphabetical and alpha-numerical groups.

The numerical values of the letters of the second group have been chosen according to the formula $13c+12$, wherein $c$ may have any value between 0 and 6, i.e. each of these values yields a remainder 12 on division by 13. These letters are used as second check symbols for alphabetical and alpha-numerical groups. The two letter groups have the letter E in common.

The numerical values of the "other symbols" are quite arbitrary. In the present example, they have been chosen in such manner that the letters have numerical values according to the formula $7a+1$, whereas the auxiliary symbols AS1 and AS2 have the remaining whole multiples of 7 as numerical values. This systematical choice of numerical values for the "other symbols" has some advantages from the point of view of circuit design, but is otherwise of no importance.

The letters of the first group represent the values of the remainder $R_{13}$ obtained on division by 13 of the number formed by the numerical values of the symbols of the group in the following manner:

| $R_{13}$ | 0 | 1 | 2 | 3 | 4 | 5 | 6 | 7 | 8 | 9 | 10 | 11 | 12 |
|---|---|---|---|---|---|---|---|---|---|---|---|---|---|
| Check symbol | G | P | Y | E | D | M | V | Z | A | J | S | W | X |

For instance, the number 36835, which yields a remainder 6 upon division by 13, will have the check symbol V. If the number 36835 is entered into the device together with its check symbol V, the 13-computer receives the values 3, 6, 8, 3, 5 and 8, since the remainder obtained on division by 13 of the numerical value 86 of the check symbol V is 8. Thus, the final position of the 13-computer corresponds with the remainder obtained upon division by 13 of the number 368358, which is 3. In other words, by entering the number with its check symbol, the 13-computer is brought into position 3. This position is the check position of this computer.

The 7-computer has been left in its zero position by the digits 3, 6, 8, 3 and 5, and is consequently brought into its 2-position by the check symbol V, as the remainder obtained on division by 7 of the numerical value of the check symbol V is 2. Position 2 is the check position of the 7-computer.

For alphabetical or alpha-numerical groups, the letters of the second group represent the values of the remainder $R_7$ obtained on division by 7 of the number formed by the numerical values of the symbols in the symbol group in the following manner:

| $R_7$ | 0 | 1 | 2 | 3 | 4 | 5 | 6 |
|---|---|---|---|---|---|---|---|
| Check symbol | H | B | Q | K | E | T | N |

Assume that the alphabetical group HARD is entered into the device. The numerical values of these letters are 38, 79, 71 and 2, so that the 13-computer receives the values 12, 1, 6 and 2 and computes the remainder obtained on division by 13 of the number 12162, which is 7, whereas the 7-computer receives the values 3, 2, 1 and 2 and computes the remainder obtained on division by 7 of the number 3212, which is 6. In consequence, the first check symbol of the group will be Z and the second check symbol N. If the group HARD is entered together with the two check symbols, i.e. if the group HARDZN is entered, the 13-computer receives the values 12, 1, 6, 2, 11 and 12 and computes the remainder on division by 13 of the number $$(12.10^5+1.10^4+6.10^3+2.10^2+11.10+12)=1216322$$

which is 3, whereas the 7-computer receives the values 3, 2, 1, 2, 2 and 5 and computes the remainder obtained on division by 7 of the number 321225, which is 2. Thus, both the 13-computer and the 7-computer assume the check position after entering of the alphabetical group with its two check symbols.

Assume that the alpha-numerical group AK59 is entered. The numerical values of the symbols are 79, 25, 70 and 35, so that the 13-computer receives the values 1, 12, 5 and 9 and computes the remainder obtained on division by 13 of the number $$(1.10^3+12.10^2+5.10+9)=2259$$

which is 10, whereas the 7-computer receives the values 2, 4, 0 and 0, and computes the remainder obtained on division by 7 of the number 2400, which is 6. As a consequence, the first check symbol of the group will be S and the second check symbol N. If the group AK59 is entered together with its two check symbols, i.e. if the group AK59SN is entered, the 13-computer receives the values 1, 12, 5, 9, 7 and 12 and computes the remainder obtained on division by 13 of the number $$(1.10^5+12.10^4+5.10^3+9.10^2+7.10+12)=225982$$

which is 3, whereas the 7-computer receives the values 2, 4, 0, 0, 2 and 5, and computes the remainder obtained on division by 7 of the number 240025, which is 2. Thus, both the 13-computer and the 7-computer assume the check position after receipt of the alpha-numerical group with its two check symbols.

It will be clear that a device constructed according to the present example responds in exactly the same manner, as far as checking is concerned, to a numerical group with one check symbol and to an alphabetical or alpha-numerical group with two check symbols. In both cases, the 13- and 7-computers are brought into their check positions 3 and 2, respectively.

If the device according to the invention is used for determining the check symbols of symbol groups for the first time, the output terminals of the 13-computer and the 7-computer are each connected with a glow lamp or similar indicator, which indicates the check symbol corresponding with the computed value $R_{13}$ or $R_7$, respectively. If a numerical group is entered into the device, two check symbols will be indicated, although only one check symbol is necessary. The second check symbol will always be the letter H, corresponding with $R_7=0$. Of course, the operator may be instructed to leave out the letter H after a numerical group, but it is also possible to provide a letter relay, which is excited as soon as a letter is entered into the device and closes the circuit of the glow lamps or similar indicators connected with the 7-computer. Thus, if no letters are entered, no second check symbol is indicated.

As the check positions of the computers differ from their zero positions, means must be provided for returning each computer to its zero position after a group has been checked. This may be done, for instance, by automatically interrupting the current of all computer relays. If the check is made in the usual manner by allowing a motor to run only if the computers are in their check positions, the necessary contacts for returning the computers to their zero position may be closed by the motor. In some instances, these contacts may be operated by the "space" key.

It is pointed out that the numerical values assigned to the letters of the first group are not equal to the arithmetical values of the corresponding check symbols to be used for determining the check symbol of the result of an arithmetical operation. In fact, if an arithmetical operation is to be performed on the check symbols of certain numbers, this operation should be performed on the values of $R_{13}$ represented by these check symbols according to the above table. However, as the mechanism for performing an arithmetical operation on the check symbols is completely separate from the device for determining a check symbol and/or for checking a symbol group already provided with a check symbol, this apparent inconsistency does not lead to any difficulties.

EXAMPLE II

In Example I, the check positions of the two computers were the 3 and 2 positions, respectively, i.e. they were different from the zero positions of the computers. In some instances, it may be of advantage to have the zero positions of the computers as check positions. For this purpose, the numerical values assigned to the letters, digits and auxiliary symbols may be chosen in the following manner.

| Digits | 0 | 1 | 2 | 3 | 4 | 5 | 6 | 7 | 8 | 9 | | |
|---|---|---|---|---|---|---|---|---|---|---|---|---|
| Numerical values | 0 | 1 | 15 | 3 | 4 | 5 | 6 | 7 | 8 | 22 | | |

| Letters (I) | A | D | G | J | M | P | S | V | Y | T | W | Z | X |
|---|---|---|---|---|---|---|---|---|---|---|---|---|---|
| Numerical values | 79 | 2 | 16 | 30 | 44 | 58 | 72 | 86 | 9 | 23 | 37 | 51 | 65 |

| Letters (II) | B | E | H | K | Q | X |
|---|---|---|---|---|---|---|
| Numerical values | 52 | 39 | 26 | 13 | 78 | 65 |

| Other symbols | C | F | I | L | O | R | U | N | AS1 | AS2 |
|---|---|---|---|---|---|---|---|---|---|---|
| Numerical values | 12 | 14 | 17 | 18 | 19 | 20 | 21 | 24 | 10 | 11 |

In general, the letters of the first group represent the value of the remainder $R_{13}$ obtained on division by 13 of the number formed by the numerical values of the symbols of the group in the following manner:

| $R_{13}$ | 0 | 1 | 2 | 3 | 4 | 5 | 6 | 7 | 8 | 9 | 10 | 11 | 12 |
|---|---|---|---|---|---|---|---|---|---|---|---|---|---|
| Check symbol | X | G | P | Y | Z | D | M | V | W | A | J | S | T |

There is one exception, however. If, for alphabetical or alpha-numerical groups, the remainder $R_7$ obtained on division by 7 of the number formed by the numerical values of the symbols of the group is equal to 4, the values of $R_{13}$ are represented by the letters of the first group as follows:

| $R_{13}$ | 0 | 1 | 2 | 3 | 4 | 5 | 6 | 7 | 8 | 9 | 10 | 11 | 12 |
|---|---|---|---|---|---|---|---|---|---|---|---|---|---|
| Check symbol | X | J | V | Z | G | S | W | D | P | T | A | M | Y |

In this case, the order of the check symbols is reversed, i.e. the "first" check symbol is written after the "second" check symbol.

For alphabetical or alpha-numerical group, the letters of the second group represent the values of the remainder $R_7$ obtained on division by 7 of the number formed by the numerical values of the symbols of the group in the following manner:

| $R_7$ | 0 | 1 | 2 | 3 | 4 | 5 | 6 |
|---|---|---|---|---|---|---|---|
| Check symbol | Q | K | E | X | K | H | B |

There are two values of $R_7$ for which the second check symbol K is found, i.e. the values 1 and 4. However, for $R_7=4$, the "second" check symbol is written before the "first" check symbol.

The above-described system is based on the following rules:

The numerical values of the letters of the first group have been chosen according to the formula $7a+b$, wherein $a$ may have any value between 0 and 12, and wherein $b$ is a constant, which may have any value between 1 and 6. In the present example, $b$ is equal to 2, i.e. each of the numerical values of the letters of the first group yields a remainder 2 on division by 7.

The numerical values of the letters of the second group are whole multiples of 13, i.e. they satisfy the formula $13c$, wherein $c$ may have any value between 0 and 6. However, one of the values satisfying this formula must be reserved to represent the digit 0, which must have a numerical value equal to a whole multiple of 13 in order to provide for arithmetical consistency. In the present case, the numerical value 0 has been used for the digit 0, so that the value 0 had to be left out in the second letter series. The two letter groups have the letter X in common.

The numerical values of the digits have been chosen in such manner, that each of them yields a remainder equal to the arithmetical value of the digit upon division by 13. As far as possible, the numerical values of the digits have been chosen equal to their arithmetical values. For the digits 2 and 9, different numerical values have been used, as the numerical values 2 and 9 had to be reserved for the first letter group.

The numerical values of the "other symbols" are arbitrary.

The fact that one of the available whole multiples of 13 is missing from the second letter group makes it necessary to reverse the order of the check symbols for the value of $R_7$ for which the missing value would otherwise be required.

The validity of the above-described system will now be shown with reference to examples.

In the present system, the number 36835, which yields a remainder 6 upon division by 13, would have the check symbol M, according to the first table. If the number 36835 is entered into the device together with its check symbol M, the 13-computer receives the values 3, 6, 8, 3, 5 and 5, since the remainder obtained on division by 13 of the numerical value 44 of the letter M is equal to 5. Thus the final position of the 13-computer corresponds with the remainder obtained on division by 13 of the number 368355, which is 0. In other words, the 13-computer is brought into its zero position by entering a number with the associated check symbol.

On the other hand, the 7-computer has successively received the values 3, 6, 1, 3, 5 and 2, corresponding to the symbols 3, 6, 8, 3, 5 and M and occupies position 5, corresponding with the remainder on division by 7 of the number 361352. In general, the 7-computer may have any of its 7 positions after a number and its check symbol have been entered. Hence, it is necessary to leave the position of the 7-computer out of consideration when checking a numerical group. For this purpose, a device operating according to the present system is provided with two letter relays. The first of these relays is excited as soon as a letter is entered into the device and prepares a circuit for the excitation of a second relay. The second relay is excited as soon as a second letter is entered. Both relays are provided with a holding circuit, which keeps the relays energized until the device is cleared. A numerical group followed by a check symbol comprises only one letter so that the second letter relay will not be excited when such a group is entered. As long as the second letter relay is deenergised, the checking circuit is connected to the zero terminal of the 13-computer only, in such manner that a symbol group which has been entered is accepted when the 13-computer occupies its zero position, independently of the position of the 7-computer.

An alphabetical or alpha-numerical group accompanied by its check symbols will comprise at least three letters, so that it will cause the second letter relay to be excited. In this case, the checking circuit is connected to the zero terminals of both the 13-computer and the 7-computer, so that the group that has been entered is only accepted when both computers are in their zero position.

Assume that the alphabetical group HEAD is entered into the device. The numerical values of the letters are 26, 39, 79 and 2, so that the 13-computer receives the values 0, 0, 1 and 2 and computes the remainder on division by 13 of the number 0012, which is 12. The 7-computer receives the values 5, 4, 2 and 2 and computes the remainder on division by 7 of the number 5422, which is 4. As $R_7=4$, the "first" check symbol must be taken from the second table, and is found to be the letter Y. The "second" check symbol is the letter K, and the order of the check symbols is reversed, so that the check symbols of the group are K and Y, in this order. If the group HEAD is entered together with its check symbols, i.e. if the group HEADKY is entered, the 13-computer receives the values 0, 0, 1, 2, 0 and 9, corresponding with the numerical values 26, 39, 79, 2, 13 and 9, so that it computes the remainder on division by 13 of the number 1209, which is 0. The 7-computer receives the values 5, 4, 2, 2, 6 and 2, and computes the remainder on division by 7 of the number 542262, which is also 0. Thus, both computers are brought into the zero position.

If the alphabetical group BEAD is entered, the 13-computer receives the values 0, 0, 1 and 2, corresponding with the numerical values 52, 39, 79 and 2, and computes the remainder on division by 13 of the number 0012, which is again 12. The 7-computer receives the values 3, 4, 2 and 2, and computes the remainder on division by 7 of the number 3422, which is 6. As $R_7$ is unequal to 4, the first check symbol must be taken from the first table, and is found to be T. The second check symbol is B, so that the group is found to have the check symbols T and B, in this order. If the complete group BEADTB is entered, the 13-computer receives the values 0, 0, 1, 2, 10 and 0, corresponding with the numerical values 52, 39, 79, 2, 23 and 52, and computes the remainder on division by 13 of the number 1300, which is 0. The 7-computer receives the values 3, 4, 2, 2, 2 and 3, and computes the remainder on division by 7 of the number 342223, which is also 0. Hence, both computers are again brought into the zero position.

Assume that the alpha-numerical group AK59 is entered. The numerical values of the symbols are 79, 13, 5 and 22, so that the 13-computer receives the values 1, 0, 5 and 9 and computes the remainder obtained on division by 13 of the number 1059, which is 6, whereas the 7-computer receives the values 2, 6, 5 and 1 and computes the remainder obtained on division by 7 of the number 2651, which is 5. As $R_7$ is unequal to 4, no reversal of the check symbols is required, and the check symbols are M and H. If the group AK59 is entered together with its check symbols, i.e. if the group AK59MH is entered, the 13-computer receives the values 1, 0, 5, 9, 5, and 0 and computes the remainder obtained on division by 13 of the number 105950, which is 0, whereas the 7-computer receives the values 2, 6, 5, 1, 2, 5 and computes the remainder obtained on division by 7 of the number 265125, which is likewise 0. Thus both computers are brought into the zero position.

If the alpha-numerical group AK57 is entered, the 13-computer receives the values 1, 0, 5 and 7 and computes the remainder obtained on division by 13 of the number 1057, which is 4, whereas the 7-computer receives the values 2, 6, 5 and 0, and computes the remainder obtained on division by 7 of the number 2650, which is 4. As $R_7=4$, the check symbols must be reversed, and the "first" check symbol must be taken from the second table, so that the correct check symbols are K and G. If the group AK57 is entered together with its two check symbols, i.e. in the form AK57KG, the 13-computer receives the values 1, 0, 5, 7, 0 and 3 and computes the remainder obtained on division by 13 of the number 105703, which is 0, whereas the 7-computer receives the values 2, 6, 5, 0, 6 and 2, and computes the remainder obtained on division by 7 of the number 265062, which is likewise 0, thus, both computers are again brought into the zero position.

It is pointed out that the reversal of the order of the check symbols for $R_7=4$ would be unnecessary if it were permissible to use the digit 0 as a second check symbol. This is thought to be unpracticable, however, as it would cause a confusion between the digit 0 and the letter O. In principle, it would also be possible to leave out the second check symbol when $R_7=4$, i.e. to use only one check symbol in this case, but this would cause the substitution of a letter for a digit to remain undetected, if the numerical value of the letter would have the same remainder on division by 13 as the digit. For instance, the alpha-numerical group 32Y4 would have the same check symbol as the number 3294.

The reversal of the order of the check symbols may be brought about by means of a switch-over relay which is energised through a make contact of the second letter relay and through a contact of the read-out switch by the voltage appearing on the terminal 4 of the 7-computer. Thus, if the device according to the invention is used to determine the check symbols of symbol groups for the first time, the switch-over relay will be energised upon depression of the read-out key whenever an alphabetical or alpha-numerical group has been entered for which $R_7=4$. The switch-over relay disconnects the normal indicator lamps from the terminals of the 13-computer, and connects these terminals with a second group of indicator lamps, according to the second table. The lamps of this second group may indicate the "second" check symbol K at the same time, or the symbol K may be indicated by a separate lamp placed in front of the said second group.

The invention will be more fully explained with reference to the accompanying drawings, which show a detailed circuit diagram of a device according to the invention, as applied to a punching machine. This circuit diagram is based on Example I. In the drawings.

In order to obtain the complete circuit diagram, FIG. 1 should be placed above, and FIG. 4 below FIG. 2, and FIG. 3 should be placed to the right of FIG. 2.

Figure 1:
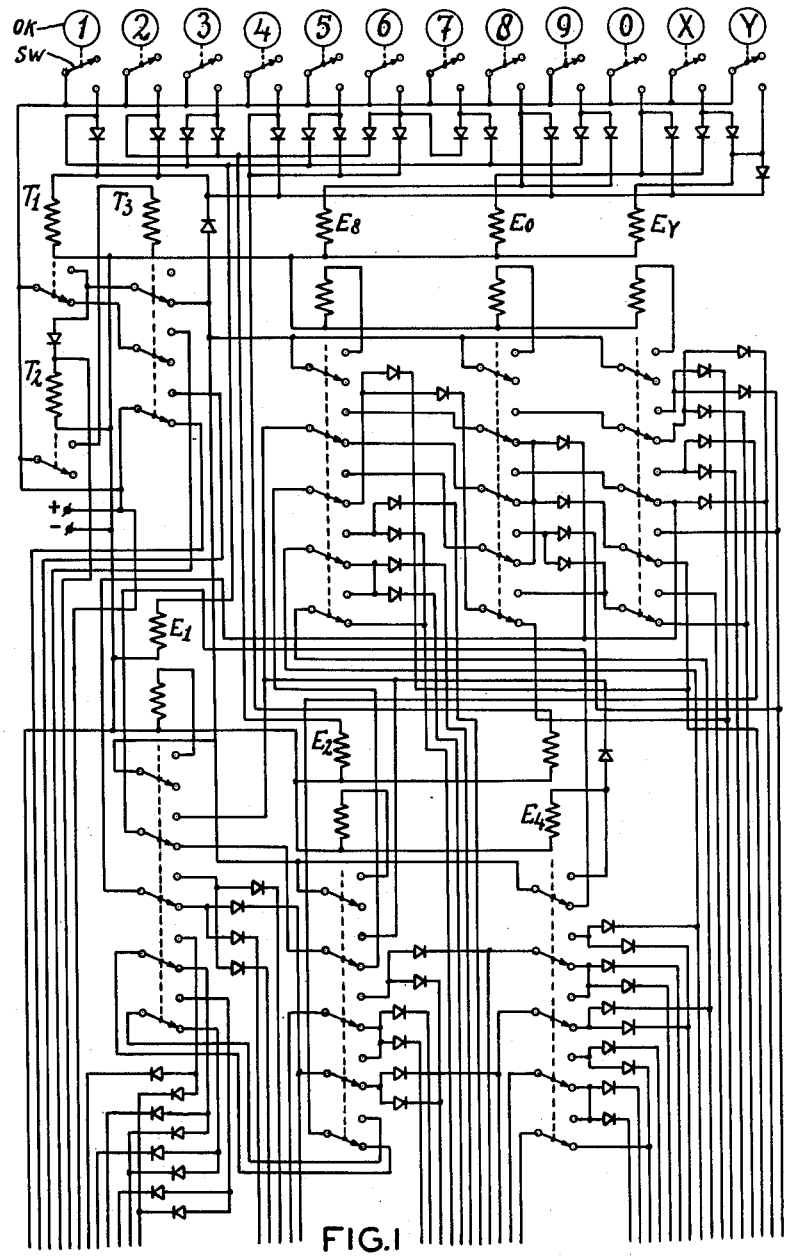
FIG. 1 shows the symbol entering keys, an input register, and a set of timing relays.

FIG. 1 shows a set of symbol entering keys OK, which are assumed to be the operating keys of a punching machine. In addition to their usual functions in the punching machine, the keys each operate a switch SW for controlling the checking device.

There are twelve symbol entering keys, to wit three "overpunch" keys marked 0, X and Y, and nine digit keys marked 1 to 9. The digit 0 is entered by striking key 0. Two auxiliary symbols may be entered by striking keys X and Y, respectively. Letters are entered by striking one overpunch key and one digit key at the same time, according to the following table.

TABLE I

| Overpunch key | Digit keys | | | | | | | | |
|---|---|---|---|---|---|---|---|---|---|
| | 1 | 2 | 3 | 4 | 5 | 6 | 7 | 8 | 9 |
| Y | A | D | G | J | M | P | S | V | Y |
| X | B | E | H | K | N | Q | T | W | Z |
| 0 | C | F | I | L | O | R | U | X | — |

For instance, the letter M is entered by striking keys Y and 5 at the same time, the letter U by striking keys 0 and 7 at the same time, and so on.

It is pointed out that the combination of keys 0 and 9 does not represent a letter. However, as the operator might strike this combination erroneously, it is preferred to assign a numerical value to this combination. In the present embodiment, the value 78 has been used for this purpose.

Thus, the values $R_{13}$ and $R_7$ to be entered in the 13-computer and the 7-computer, respectively, when a key or a combination of keys is struck, may be represented by the following table.

TABLE II

| | | Digit keys | | | | | | | | | |
|---|---|---|---|---|---|---|---|---|---|---|---|
| | | 1 | 2 | 3 | 4 | 5 | 6 | 7 | 8 | 9 | none |
| Overpunch key: Y | $R_{13}$ | 1 | 2 | 3 | 4 | 5 | 6 | 7 | 8 | 9 | 11 |
| | $R_7$ | 2 | 2 | 2 | 2 | 2 | 2 | 2 | 2 | 2 | 0 |
| X | $R_{13}$ | 12 | 12 | 12 | 12 | 12 | 12 | 12 | 10 | 11 | 10 |
| | $R_7$ | 1 | 2 | 3 | 4 | 5 | 6 | 0 | 2 | 2 | 0 |
| 0 | $R_{13}$ | 1 | 2 | 3 | 4 | 5 | 6 | 7 | 0 | 0 | 0 |
| | $R_7$ | 1 | 1 | 1 | 1 | 1 | 1 | 1 | 2 | 1 | 0 |
| none | $R_{13}$ | 1 | 2 | 3 | 4 | 5 | 6 | 7 | 8 | 9 | |
| | $R_7$ | 0 | 0 | 0 | 0 | 0 | 0 | 0 | 0 | 0 | |

It may easily be verified that these values correspond with the numerical values assigned to the symbols according to Example I.

FIG. 1 further shows an input register comprising six relays E1, E2, E4, E8, E0 and EY. Each of these relays has two windings, to wit an operating winding, and a holding winding shown underneath the operating winding, and five contacts. Where reference will have to be made hereinafter to any specific contact of a relay, the contacts will be assumed to be numbered from top to bottom, i.e. the topmost contact will be designated as contact 1, the second contact from above as contact 2, and so on.

Whenever one of the keys OK is struck, the positive terminal of the voltage source will be connected through the associated switch SW with the operating windings of one or more of the relays of the input register, so that these relays are energized. The relays energized by the depression of any key are shown in the following table.

TABLE III

| Key: | Relays |
|---|---|
| 1 | E1 |
| 2 | E2 |
| 3 | E1, E2 |
| 4 | E4 |
| 5 | E1, E4 |
| 6 | E2, E4 |
| 7 | E1, E2, E4 |
| 8 | E8 |
| 9 | E1, E8 |
| 0 | E0 |
| X | E0, EY |
| Y | EY |

If two keys are struck simultaneously, the associated relays are energized at the same time. For instance, the letter N is entered by striking keys X and 5 simultaneously, whereby relays E0, EY, E1 and E4 are energized.

FIG. 1 further shows a set of timing relays, comprising three relays T1, T2 and T3. The operating winding of relays T1 is connected through suitable coupling rectifiers with the operating windings of all relays of the input register, so that relay T1 is energized whenever any relay of the input register is energized, i.e. whenever a key is struck. Relay T1 is held through a holding circuit comprising contact 1 of relays T3.

As soon as relay T1 has changed over its contact, relay T2 is energized. Relay T2 changes over its contact and energizes relay T3, whereby the holding circuit of relay T1 is interrupted. Thus, if the keys have been released in the meantime, relays T1, T2 and T3 are successively deenergized. Otherwise, they are successively de-energized as soon as the keys have been released.

It will be seen that a holding circuit for the relays of the input register has been provided through the contact of relay T1 and contact 1 of relay T3.

Relays T1—T3 serve for operating the registers of the 13-computer and the 7-computer in the right order, as will be described hereinafter.

Figure 2:
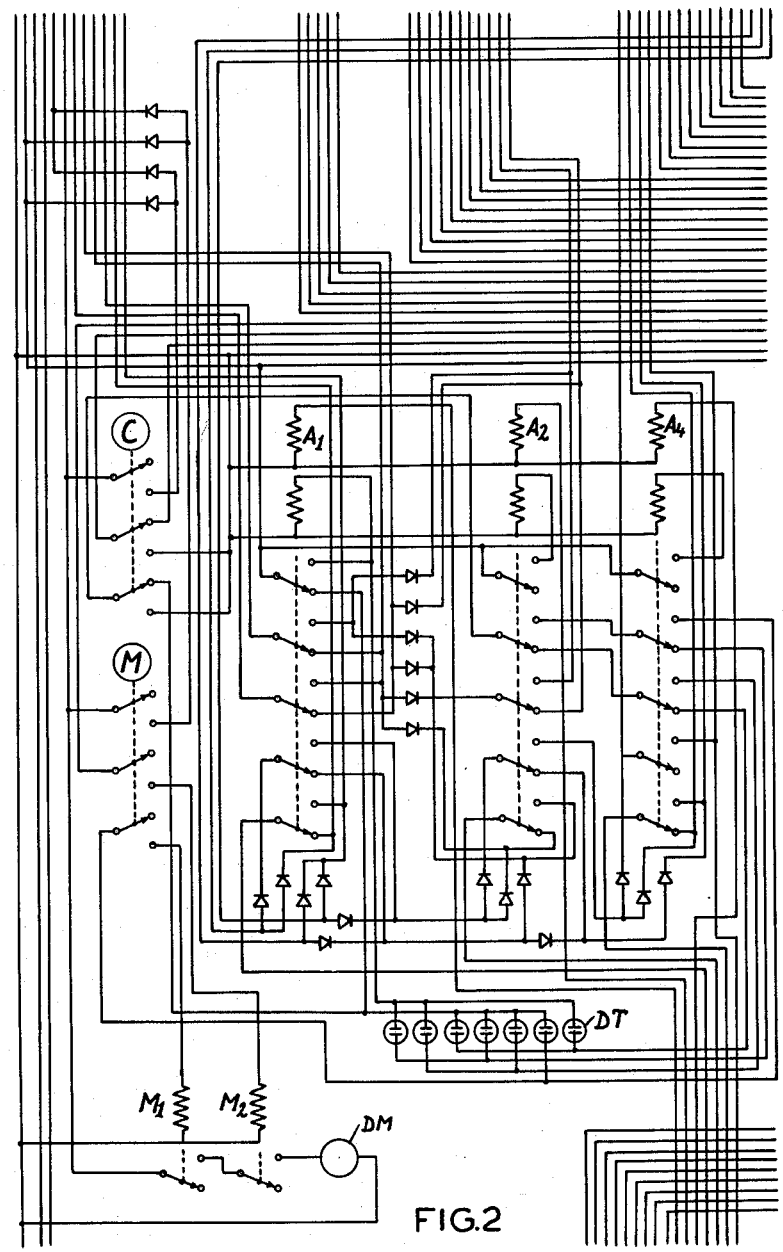
FIG. 2 shows the adding register of the 7-computer, a read-out key, and a checking key.
Figure 4:
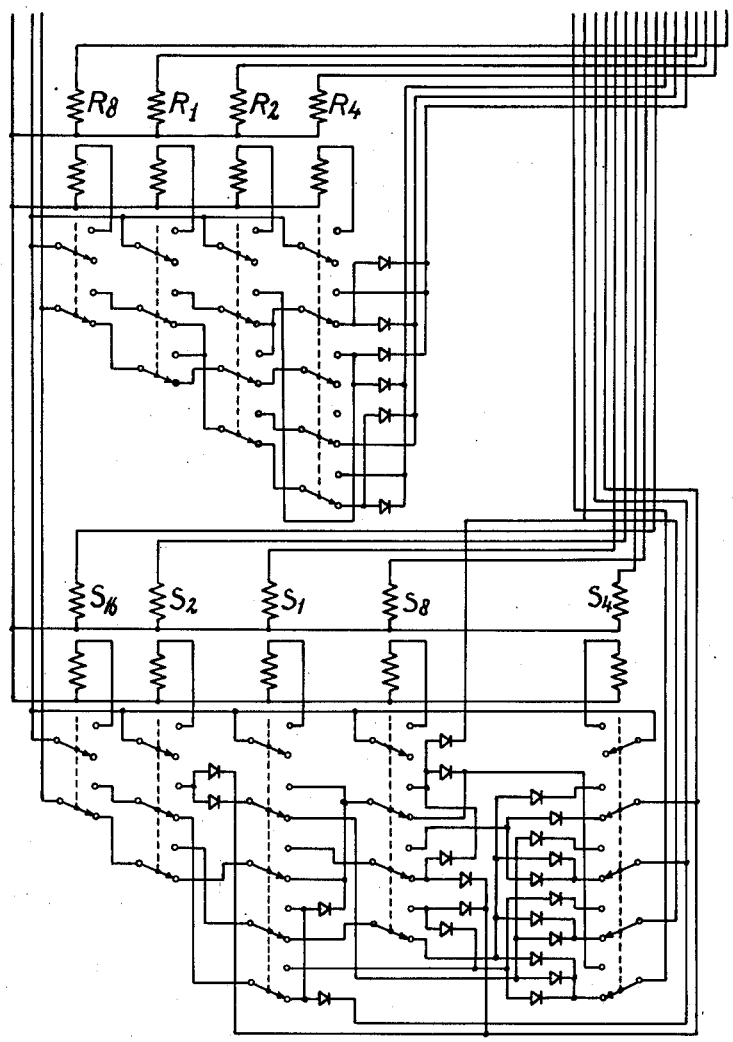
FIG. 4 shows the result registers of the 7-computer and the 13-computer.

The 7-computer consists of an adding register, shown in FIG. 2 and a result register shown in FIG. 4. The adding register comprises three relays A1, A2 and A4, and the result register comprises four relays R1, R2, R4 and R8. The computer operates according to the equation:

$$p_{i+1} = R_7(10p_i + a_i)$$

wherein $p_{i+1}$ is the new check value to be computed after a symbol has been entered, $p_i$ is the previous check value, $a_i$ is the remainder on division by 7 of the numerical value of the symbol that has been entered, and $R_7$ is an operator denoting that the remainder on division by 7 of the number in brackets is to be taken.

For this purpose, after a check value $p_i$ has been computed, the value $R_7(10p_i)$ is stored in the binary fashion in the relays of the adding register. For instance, if $R_7(10p_i) = 6$, relays A2 and A4 are energized. As soon as the new symbol has been entered, the adding register performs the addition $R_7(10p_i) + a_i$, and stores the sum in binary fashion in the relays of the result register. For instance, if $a_i = 4$, the sum will be 10, and relays R2 and R8 will be energized. After that, the value $R_7(10p_{i+1})$ is again stored in the relays of the adding register. In the present case, this value will be $R_7(100) = 2$, so that relay A2 is energized.

Figure 3:
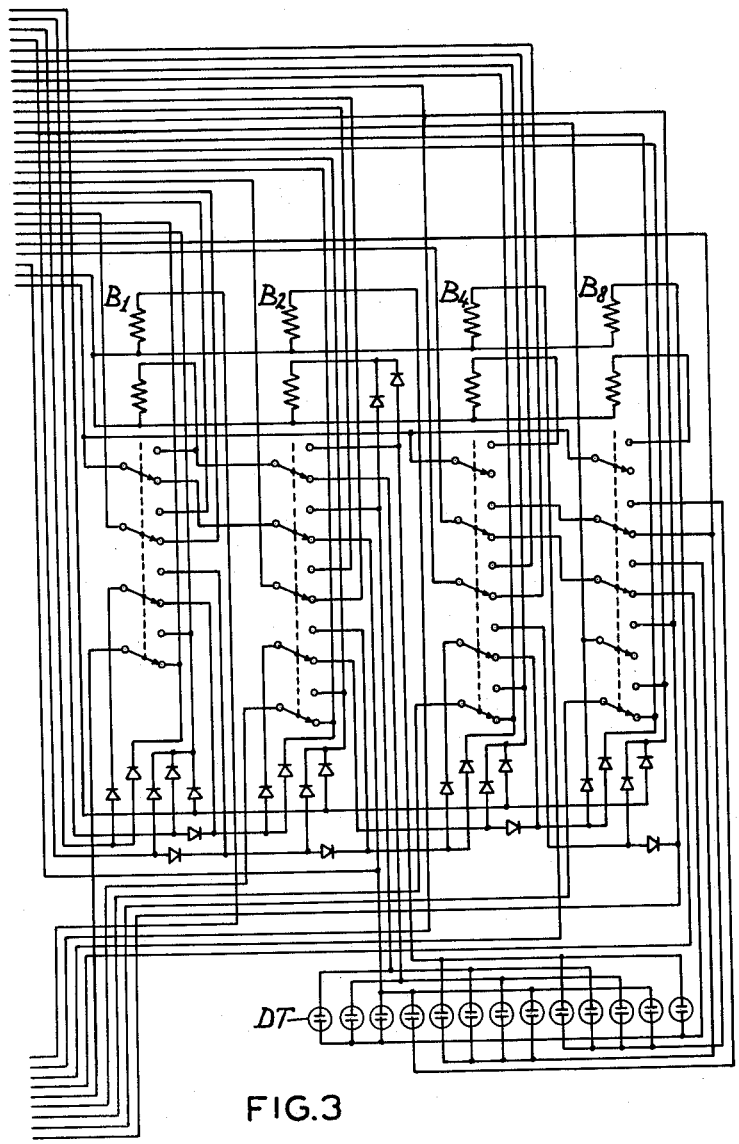
FIG. 3 shows the adding register of the 13-computer.

The 13-computer consists of an adding register, shown in FIG. 3, and a result register, shown in FIG. 4. The adding register comprises four relays B1, B2, B4 and B8, and the result register comprises five relays S1, S2, S4, S8 and S16. The computer operates according to the equation:

$$p_{i+1} = R_{13}(10p_i + a_i)$$

in substantially the same way as the 7-computer.

FIG. 2 shows a read-out key marked C and a checking key marked M.

The read-out key is actuated after a symbol group has been entered in the case that the device is used for determining the check symbols of a symbol group. Upon depression of this key, the first check symbol is made visible by one of the discharge tubes DT coupled with the adding register of the 13-computer, and the second check symbol is made visible by one of the discharge tubes DT coupled with the adding register of the 7-computer (FIG. 2).

The checking key is actuated after a symbol group has been entered together with its check symbol or check symbols in the case that the device is used for checking purposes. If both computers are in their checking position, relays M1 and M2 are energized, whereby the motor DM is switched on.

The operation of the circuit is as follows.

When a symbol is entered by means of keys OK, the appropriate relays of the input register are energized, simultaneously with relay T1. As soon as relay T1 has changed over its contact, a holding circuit for the input register is established through said contact and contact 1 of relay T3, so that the keys may be released, if desired. The adding circuit is energized at the same time in order to add the $R_{13}$- and $R_7$-values of the entered symbol to the values stored in the adding registers. The adding circuit begins at contact 1 of relay E4.

By reference to table II, it may be seen that two cases may be distinguished with respect to the $R_{13}$- and $R_7$-values.

If key Y is struck in combination with any of the digit keys 1–9, or key 0 in combination with any of the digit keys 1–7, or if a digit key is struck alone, i.e. without an overpunch key, $R_{13}$ is represented in binary fashion by relays E1, E2, E4 and E8. In this case, the addition is performed by a cooperation of contact 3 of relay E1, contacts 3 and 4 of relay E2, contacts 2 and 3 of relay E4, and contacts 4 and 5 of relay E8 on the one hand, and contacts 2 and 4 of relay B1, contacts 3 and 5 of relay B2, contacts 3 and 5 of relay B4, and contacts 4 and 5 of relay B8 on the other hand.

For other key combinations, $R_{13}$ is not represented by the positions of relays E1–E3, but has a constant value 10, 11, 12 or 0. In this case, the addition is performed by cooperation of contact 5 of relay 0 and contacts 2, 4 and 5 of relay Y on the one hand with contacts 3 and 4 of relay B1, contacts 4 and 5 of relay B2, contacts 4 and 5 of relay B4, and contacts 4 and 5 of relay B8 on the other hand.

Similarly, if key X is struck in combination with any of the digit keys 1–7, $R_7$ is represented in binary fashion by the positions of relays E1, E2 and E4. It is pointed out that the value 7 for $R_7$ is equivalent to the value zero. In this case, the addition is performed by cooperation of contact 5 of relay E2, contacts 4 and 5 of relay E1, and contacts 4 and 5 of relay E4 on the one hand, with contacts 2, 3 and 5 of relay A1, contacts 3 and 5 of relay A2, and contacts 4 and 5 of relay A4 on the other hand.

For other key combinations, $R_7$ is not represented by the positions of relays E1, E2 and E4, but has a constant value 0, 1 or 2. In this case, the addition is performed by cooperation of contact 3 of relay E8, contact 4 of relay E0, and contacts 2, 3 and 4 of relay EY on the one hand, with contacts 4 and 5 of relay A1, contacts 4 and 5 of relay A2, and contacts 4 and 5 of relay A4 on the other hand.

A circuit comprising contact 1 of relay E4, contact 2 of relay E1, contact 2 of relay E2, contacts 2 and 3 of relay E8, contacts 2, 3, 4 and 5 of relay E0 and contact 3 of relay EY serves to determine the kind of addition to be performed in any case. The circuits involved may be easily traced in the drawings, so that a more detailed description appears to be superfluous.

During the addition, the relays of the input register are held through the contact of relay T1 and contact 1 of relay T3, and the relays of the adding registers are held through contact 3 of relay T3.

In the meantime, relays T2 and T3 are successively energized. When relay T3 changes over its contacts, the adding circuit and the holding circuits of the adding registers and the input register are interrupted, and the relays of the result registers are now held through contact 3 of relay T3. If the keys have been released in the meantime, relay T1 is de-energized. Otherwise, relay T1 is held until the keys are released.

As soon as relay T1 is deenergized and changes over its contact, a circuit is closed from the positive terminal of the voltage source to contact 2 of relay R8 and to contact 2 of relay S16, whereby the values $R_7(10p_{i+1})$ and $R_{13}(10p_{i+1})$ are stored in the adding registers. The circuits provided for this purpose may be easily traced from the drawings, so that a more detailed description appears to be superfluous.

In the meantime, relays T2 and T3 are successively de-energized, and as soon as relay T3 changes over its contacts, the holding circuit of the result registers is interrupted and the holding circuit for the adding registers is re-established, so that the device is again ready to accept a symbol. The relays of the result registers are de-energized, so that the last check values that have been computed may only be found in the adding registers.

If the device is used for determining the check symbols of symbol groups, the check symbols may be read out of the adding registers as soon as the symbol group has been entered by depressing key C (FIG. 2). This key operates a set of three contacts. Contact 1 establishes a new holding circuit for the adding registers and energizes relay T2. Contact 2 supplies a negative voltage to contact 2 of relay B4 (FIG. 3), whereby one of the discharge tubes DT connected with adding register B1–B8 is ignited. Contact 3 supplies a negative voltage to contact 2 of relay A2, whereby one of the discharge tubes DT connected with adding register A1–A4 is ignited. The said discharge tubes have been arranged in such order that they represent the letters of the first and second group, respectively, in the same order as in Example I.

Through contact 1 of key C, relay T2 is energized, so that relay T3 will likewise be energized. As long as key C is held in its depressed position, nothing happens, as a new holding circuit has been establishing through contact 1. As soon as key C is released, the holding circuit of the adding registers is interrupted, whereby the adding registers are reset to their zero or initial position. Relays T2 and T3 are successively de-energized.

If the device is used for checking symbol groups entered together with their check symbols, the checking key M is depressed after the complete group, including the check symbols, has been entered. If the group did not contain any errors, the last check values computed were 3 and 2, so that the values stored in the adding registers are $R_{13}(30)=4$, and $R_7(20)=6$, respectively.

Key M operates a set of three contacts. The first contact establishes a new holding circuit for the adding registers and energizes relay T2, just like the first contact of key C. Through contacts 2 and 3 of key M, relays M1 and M2 are energized if the adding registers are in their correct checking positions 4 and 6, respectively. Thus, motor DM is only energized if no errors appear in the symbol group.

The device responds in exactly the same manner to a numerical group entered with one check symbol as to an alphabetical or alpha-numerical group entered with two check symbols.

When the check symbols of numerical groups are determined by means of the device as described hereinbefore, two check symbols are found, of which the second check symbol is always the letter H. The operator may be instructed to leave out this H where numerical groups are concerned. If desired, a letter relay may be provided, which interrupts the circuit of the discharge tubes of adding register A1–A4 as long as no letter has been entered. Thus, the second check symbol will only be indicated if the group contains at least one letter.

The operation of the device shown in FIGS. 1–4 will now be further explained by reference to some specific examples.

In these examples, the condition of the relays will be indicated by the letter "$u$" for the energized condition, and by the letter "$d$" for the de-energized condition. These letters will be followed by the number of the contact; as hereinbefore, the contacts are assumed to be numbered from top to bottom. Thus, the expression "$E8u2$" means: "the second contact from the top of relay E8, which is in its energized condition," and the expression "$S2d3$" means: "the third contact from the top of relay S2, which is in its de-energized condition."

The condition of switches C and M will be indicated by the letter "$a$" for the condition as shown in the drawings, and by the letter "$b$" for the opposite condition; these letters will be likewise followed by the number of the contact. Thus, the expression "$Ca2$" means: "the second contact from the top of switch C, which is in the condition as shown in the drawings," and the expression "$Mb3$" means: "the third contact from the top of switch M, which is in the condition opposite to that shown in the drawings."

The operating winding of any of the relays will be indicated by the letter W, followed by the reference numeral of the relay in brackets; the holding winding will be similarly indicated by the letter "H." Thus, the expression "W(B2)" means: "the operating winding of relay B2," and the expression H(E8) means: "the holding winding of relay E8."

EXAMPLE III

*Determination of the Check Symbol of the Number 36835*

(1a) Key 3 is depressed to enter digit 3. Relays E1, E2 and T1 are energized, and held through circuits:

plus—$T1u1$—$T3d1$—W(T1)—minus;
plus—$T1u1$—$T3d1$—H(E1)—minus;
plus—$T1u1$—$T3d1$—H(E2)—minus.

(1b) Relays T2, S1 and S2 are energized through circuits:

plus—$T1u1$—W(T2)—minus;
plus—$T1u1$—$T3d1$—$E4d1$—$E1u2$—$E8d2$—$E0d3$—$E1u3$—$B1d4$—W(S1)—minus;
plus—$T1u1$—$T3d1$—$E4d1$—$E1u2$—$E8d2$—$E0d3$—$E1u3$—$B1d2$—$E2u4$—$B2d5$—W(S2)—minus.

(1c) Relay T3 is energized through circuit:

plus—$T2u1$—W(T3)—minus.

Relays S1 and S2 are held through circuits:

plus—$T3u3$—$S1u1$—H(S1)—minus;
plus—$T3u3$—$S2u1$—H(S2)—minus.

(1d) Relays T1, E1 and E2 are de-energized by interruption of their holding circuits at contact 1 of relay T3, provided that key 3 has been released.

Relay B4 is energized through circuit:

plus—$T1d1$—$T3u2$—$S16d2$—$S2u3$—$S1u4$—W(B4)—minus.

(1e) Relay T2 is de-energized by interruption of its operating circuit at contact 1 of relay T1.

(1f) Relay T3 is de-energized by interruption of its operating circuit at the contact of relay T2. Relay B4 is held through circuit:

plus—$T3d3$—$B4u1$—H(B4)— minus.

Relays S1 and S2 are de-energized.

(2a) Key 6 is depressed to enter digit 6. Relays E2, E4 and T1 are energized and held.

(2b) Relay T2 is energized.

Relays S2 and S8 are energized through circuits:

plus—$T1u1$—$T3d1$—$E4u1$—$E8d2$—$E0d3$—$E1d3$—$E2u4$—$B2d5$—W(S2)—minus;
plus—$T1u1$—$T3d1$—$E4d1$—$E8d2$—$E0d3$—$E1d3$—$E2u4$—$B2d3$—$E4u3$—$B4u3$—$E8d4$—$B8d5$—W(S8)—minus.

(2c) Relay T3 is energized. The holding circuit of relay B4 is interrupted. Relays S2 and S8 are held.

(2d) Relays T1, E2 and E4 are de-energized, provided that key 6 has been released. Relay B4 is de-energized. Relays B1 and B8 are energized through circuits:

plus—$T1d1$—$T3u2$—$S16d2$—$S2u3$—$S1d4$—$S8u4$—$S4d5$—W(B1)—minus;
plus—$T1d1$—$T3u2$—$S16d2$—$S2u3$—$S1d4$—$S8u4$—W(B8)—minus.

(2e) Relay T2 is de-energized.

(2f) Relay T3 is de-energized. Relays B1 and B8 are held. Relays S2 and S8 are de-energized.

(3a) Key 8 is depressed to enter digit 8. Relays E8 and T1 are energized and held.

(3b) Relay T2 is energized.

Relays S1 and S16 are energized through circuits:

plus—$T1u1$—$T3d1$—$E4d1$—$E1d2$—$E2d2$—$E8u3$—$E0d4$—$E1d3$—$B1u4$—W(S1)—minus;
plus—$T1u1$—$T3d1$—$E4d1$—$E1d2$—$E2d2$—$E8u3$—$E0d4$—$E1d3$—$E2d4$—$E4d3$—$E8u5$—$B8u4$—W(S16)—minus.

(3c) Relay T3 is energized. The holding circuits of relays B1 and B8 are interrupted. Relays S1 and S16 are held.

(3d) Relays T1 and E8 are de-energized, provided that key 8 has been released. Relay B8 is de-energized. Relay B1 is energized through circuit:

plus—$T1d1$—$T3u2$—$S16u2$—$S2d2$—$S1u5$—$S4d5$—$W(B1)$—minus.

(3e) Relay T2 is de-energized.
(3f) Relay T3 is de-energized. Relay B1 is held. Relays S1 and S16 are de-energized.
(4a) Key 3 is depressed to enter digit 3. Relays T1, E1 and E2 are energized and held.
(4b) Relay T2 is energized.
Relay S4 is energized through circuit:

plus—$T1u1$—$T3d1$—$E4d1$—$E1u2$—$E8d2$—$E0d3$—$E1u3$—$B1u2$—$E2u3$—$E4d2$—$B4d5$—$W(S4)$—minus.

(4c) Relay T3 is energized. The holding circuit of relay B1 is interrupted. Relay S4 is held.
(4d) Relays T1, E1 and E2 are de-energized, provided that key 3 has been released.
Relay B1 is energized through circuit:

plus—$T1d1$—$T3u2$—$S16d2$—$S2d3$—$S1d3$—$S8d2$—$S4u5$—$W(B1)$—minus.

(4e) Relay T2 is de-energized.
(4f) Relay T3 is de-energized. Relay B1 is held. Relay S4 is de-energized.
(5a) Key 5 is depressed to enter digit 5. Relays T1, E1 and E4 are energized and held.
(5b) Relay T2 is energized.
Relays S2 and S4 are energized through circuits:

plus—$T1u1$—$T3d1$—$E4u1$—$E8d2$—$E0d3$—$E1u3$—$B1u2$—$E2d3$—$B2d5$—$W(S2)$—minus;
plus—$T1u1$—$T3d1$—$E4u1$—$E8d2$—$E0d3$—$E1u3$—$B1u2$—$E2d3$—$B2d3$—$E4u3$—$B4d5$—$W(S4)$—minus.

(5c) Relay T3 is energized. The holding circuit of relay B1 is interrupted. Relays S2 and S8 are held.
(5d) Relays T1, E1 and E4 are de-energized, provided that key 5 has been released. Relay B1 is de-energized.
Relay B8 is energized through circuit:

plus—$T1d1$—$T3u2$—$S16d2$—$S2u3$—$S1d4$—$S8d4$—$S4u2$—$W(B8)$—minus.

(5e) Relay T2 is de-energized.
(5f) Relay T3 is de-energized. Relay B8 is held. Relays S2 and S8 are de-energized.

During the above steps, the 7-computer, consisting of relays A1–A4 and R1–R8, has not been actuated.

(6a) Key C is depressed to read out the result. Relay T2 is energized through circuit:

plus—$Cb1$—$W(T2)$—minus.

Discharge tube DT8 (No. 8 from the left) in FIG. 3 is ignited through circuit:

plus—$Cb1$—$B1d1$—$B2d2$—$DT8$—$B8u3$—$B4d2$—$Cb2$—minus.

As the discharge tubes DT in FIG. 3 are arranged, from left to right, in the order of the letters of the first group, check letter V is read.
Discharge tube DT3 (No. 3 from the left) in FIG. 4 is ignited through circuit:

plus—$Cb1$—$A1d1$—$DT3$—$A4d3$—$A2d2$—$Cb3$—minus.

As the discharge tubes DT in FIG. 4 are arranged, from left to right, in the order of the letters of the second group, check letter H is read. However, the operator knows that this check letter need not be appended to the symbol group, since a numerical group is involved.
(6b) Relay T3 is energized and interrupts the holding circuit of relay B8.
However, this relay is held through contact $Cb1$. As soon as key C is released, relay B8 is de-energized, so that the device is returned to its starting condition.

EXAMPLE IV

*Checking the Number 36835, Accompanied by its Check Letter V*

The first five steps are exactly the same as in Example III.

(6a) Keys Y and 8 are depressed to enter check letter V. Relays T1, EY and E8 are energized and held.
(6b) Relay T2 is energized.
Relays S16 and R2 are energized through circuits:

plus—$T1u1$—$T3d1$—$E4d1$—$E1d2$—$E2d2$—$E8u3$—$E0d4$—$E1d3$—$E2d4$—$E4d3$—$E8u5$—$B8u5$—$W(S16)$—minus;
plus—$T1u1$—$T3d1$—$E4d1$—$E1d2$—$E2d2$—$E8u3$—$E0d4$—$EYu4$—$A2d5$—$W(R2)$—minus.

(6c) Relay T3 is energized. The holding circuit of relay B8 is interrupted. Relays S16 and R2 are held.
(6d) Relays T1, EY and E8 are de-energized, provided that keys Y and 8 have been released. Relay B8 is de-energized.
Relays B4, A2 and A4 are energized through circuits:

plus—$T1d1$—$T3u2$—$S16u2$—$S1d5$—$W(B4)$—minus;
plus — $T1d1$ — $T3u2$ — $R8d2$—$R1d3$—$R2u3$—$R4d2$—$W(A2)$—minus;
plus—$T1d1$—$T3u2$—$R8d2$—$R1d3$—$R2u3$—$R4d2$—$W(A4)$—minus.

(6e) Relay T2 is de-energized.
(6f) Relay T3 is de-energized. Relays B4, A2 and A4 are held. Relays S16 and R2 are de-energized.
(7a) Key M is depressed to check the group. Relay T2 is energized through circuit:

plus—$Mb1$—$W(T2)$—minus.

Relay M1 is energized through circuit:

plus—$Mb1$—$A1d1$—$Ca3$—$A2u2$—$A4u2$—$Mb3$—$W(M1)$—minus.

Relay M2 is energized through circuit:

plus—$Mb1$—$B1d1$—$B2d2$—$Ca2$—$B4u2$—$B8d2$—$Mb2$—$W(M2)$—minus.

(7b) Relay T3 is energized and interrupts the holding circuits of relays B4, A2 and A4. However, these relays are held through contact $Mb1$. Motor DM is actuated through circuit:

plus—$M1u1$—$M2u1$—$DM$—minus.

As soon as the key M is released, relays B4, A2 and A4 are de-energized, so that the device is returned to its starting condition.

EXAMPLE V

*Determination of the Check Letters of Alphabetcial Group HARD*

The operation of timing relays T1–T3 is exactly the same as in Examples III and IV and will be left out for the sake of simplicity.

(1a) Keys X and 3 are depressed to enter letter H. Relays E1, E2, E0 and EY are energized.
(1b) Relays S4, S8, R1 and R2 are energized through circuits:

plus—$T1u1$—$T3d1$—$E4d1$—$E1u2$—$E8d2$—$E0u3$—$EYu3$—$B4d5$—$W(S4)$—minus;
plus—$T1u1$—$T3d1$—$E4d1$—$E1u2$—$E8d2$—$E0u3$—$EYu3$—$B4d4$—$W(S8)$—minus;
plus—$T1u1$—$T3d1$—$E4d1$—$E1u2$—$E8d2$—$E0u3$—$EYu3$—$E2u5$—$E1u5$—$A1d5$—$W(R1)$—minus;
plus—$T1u1$—$T3d1$—$E4d1$—$E1u2$—$E8d2$—$E0u3$—$EYu3$—$E2u5$—$E1u5$—$A1d2$—$A2d5$—$W(R2)$—minus.

(1d) Relays E1, E2, E0 and EY are de-energized. Relays B1, B2 and A2 are energized through circuits:

plus—$T1d1$—$T3u2$—$S16d2$—$S2d3$—$S1d3$—$S8u2$—$S4u5$—$W(B1)$—minus;
plus—$T1d1$—$T3u2$—$S16d2$—$S2d3$—$S1d3$—$S8u2$—$W(B2)$—minus;

plus—T1d1—T3u2—R8d2—R1u3—R2u4—W(A2)—
minus.

(1f) Relays S4, S8, R1 and R2 are de-energized.
(2a) Keys Y and 1 are depressed to enter letter A. Relays E1 and EY are energized.

(2b) Relays S4 and R4 are energized through circuits:

plus—T1u1—T3d1—E4d1—E1u2—E8d2—E0d3—
 E1u3—B1u2—E2d3—B2u3—E4d2—B4d5—W(S4)—
 minus;
plus—T1u1—T3d1—E4d1—E1u2—E8d2—E0d3—
 EYu4—A2u4—A4d5—W(R4)—minus.

(2d) Relays E1, EY, B2 and A2 are de-energized. Relays B1, A1 and A4 are energized through circuits:

plus—T1d1—T3u2—S16d2—S2d3—S1d3—S8d2—
 S4u5—W(B1)—minus;
plus—T1d1—T3u2—R8d2—R1d3—R2d3—R4u3—
 W(A1)—minus;
plus—T1d1—T3u2—R8d2—R1d3—R2d3—R4u3—
 W(A4)—minus.

(2f) Relays S4 and R4 are de-energized.
(3a) Keys 0 and 6 are depressed to enter letter R. Relays E2, E4 and E0 are energized.
(3b) Relays S1, S2, S4, R2 and R4 are energized through circuits:

plus—T1u1—T3d1—E4u1—E8d2—E0u3—EYd3—
 E1d3—E2u4—B2d5—W(S2)—minus;
plus—T1u1—T3d1—E4u1—E8d2—E0u3—EYd3—
 E1d3—E2u4—B2d5—W(S2)—minus;
plus—T1u1—T3d1—E4u1—E8d2—E0u3—EYd3—
 E1d3—E2u4—B2d3—E4u3—B4d5—W(S4)—minus;
plus—T1u1—T3d1—E4u1—E8d2—E0u3—EY3—
 A1u4—A2d5—W(R2)—minus;
plus—T1u1—T3d1—E4u1—E8d2—E0u3—EY3—
 A1u4—A2d4—A4u5—W(R4)—minus.

(3d) Relays E2, E4, E0 and A1 are de-energized. Relays B1, B4 and A4 are energized through circuits:

plus—T1d1—T3u2—S16d2—S2u3—S1u4—S8d2—
 S4u5—W(B1)—minus;
plus—T1d1—T3u2—S16d2—S2u3—S1u4—W(B4)—
 minus;
plus—T1d1—T3u2—R8d2—R1d3—R2u3—R4u3—
 W(A4)—minus.

(3f) Relays S1, S2, S4, R2 and R4 are de-energized.
(4a) Keys Y and 2 are depressed to enter letter D. Relays E2 and EY are energized.
(4b) Relays S1, S2, S4, R2 and R4 are energized through circuits:

plus—T1u1—T3d1—E4d1—E1d2—E2u2—E8d2—
 E0d3—E1d3—B1u4—W(S1)—minus;
plus—T1u1—T3d1—E4d1—E1d2—E2u2—E8d2—
 E0d3—E1d3—E2u4—B2d5—W(S2)—minus;
plus—T1u1—T3d1—E4d1—E1d2—E2u2—E8d2—
 E0d3—E1d3—E2u4—B2d3—E4d3—B4u5—
 W(S4)—minus;
plus—T1u1—T3d1—E4d1—E1d2—E2u2—E8d2—
 E0d3—EYu4—A2d5—W(R2)—minus;
plus—T1u1—T3d1—E4d1—E1d2—E2u2—E8d2—
 E0d3—EYu4—A2d4—A4u5—W(R4)—minus.

(4) Relays E2 and EY are de-energized. Relays B1, B4 and A4 are energized through circuits:

plus—T1d1—T3u2—S16d2—S2u3—S1u4—S8d2—
 S4u5—W(B1)—minus;
plus—T1d1—T3u2—S16d2—S2u3—S1u4—W(B4)—
 minus;
plus—T1d1—T3u2—R8d2—R1d3—R2u3—R4u3—
 W(A4)—minus.

(4f) Relays S1, S2, S4, R2 and R4 are de-energized.
(5a) Key C is depressed to read out the result.

Discharge tube DT11 (No. 11 from the left) in FIG. 3 is ignited through circuit:

plus—Cb1—B1u1—B2d1—DT11—B8d2—B4u2—
 Cb2—minus.

The first check letter is Z.
Discharge tube DT5 (No. 5 from the left) in FIG. 4 is ignited through circuit:

plus—Cb1—A1d1—DT5—A4u3—A2d2—Cb3—minus.

The second check letter is N.
(5b) Relays B1, B4 and A4 are de-energized.

EXAMPLE VI

*Checking of Group HARD, Accompanied by Its Check Letters Z and N*

The first four steps are exactly the same as in Example V.

(5a) Keys X and 9 are depressed to enter check letter Z. Relays E1, E8, E0 and EY are energized.
(5b) Relays S16, R2 and R4 are energized through circuits:

plus—T1u1—T3d1—E4d1—E1u2—E8u2—E0u2—
 EYu2—B1u3—B4u4—W(S16)—minus;
plus—T1u1—T3d1—E4d1—E1u2—E8u2—E0u2—
 EYu2—A2d5—W(R2)—minus;
plus—T1d1—T3d1—E4d1—E1u2—E8u2—E0u2—
 EYu2—A2d4—A4u5—W(R4)—minus.

(5d) Relays E1, E8, E0, EY and B1 are de-energized. Relays B4 and A4 are energized through circuits:

plus—T1d1—T3u2—S16u2—S2d2—S1d5—W(B4)—
 minus;
plus—T1d1—T3u2—R8d2—R1d3—R2u3—R4u2—
 W(A4)—minus.

(5f) Relays S16, R2 and R4 are de-energized.
(6a) Keys X and 5 are depressed to enter check letter N. Relays E1, E4, E0 and EY are energized.
(6b) Relays S16, R1 and R8 are energized through circuits:

plus—T1u1—T3d1—E4u1—E8d2—E0u3—EYu3—
 B4u4—W(S16)—minus;
plus—T1u1—T3d1—E4u1—E8d2—E0u3—EYu3—
 E2d5—E1u4—A1d5—W(R1)—minus;
plus—T1u1—T3d1—E4u1—E8d2—E0u3—EYu3—
 E2d5—E1u4—A1d3—E4u5—A4u4—W(R8)—
 minus.

(6d) Relays E1, E8, E0 and EY are de-energized. Relays B4, A2 and A4 are energized through circuits:

plus—T1d1—T3u2—S16d2—S2d2—S1d5—W(B4)—
 minus;
plus—T1d1—T3u2—R8u2—R1u2—R2d2—R4d2—
 W(A2)—minus;
plus—T1d1—T3u2—R8u2—R1u2—R2d2—R4d2—
 W(A4)—minus.

(6f) Relays S16, R1 and R8 are de-energized.
(7a) Key M is depressed to check the group.
Relays M1 and M2 are energized through circuits:

plus—Mb1—A1d1—Ca3—A2u2—A4u2—Mb3—
 W(M1)—minus;
plus—Mb1—B1d1—B2d2—Ca2—B4u2—B8d2—
 Mb2—W(M2)—minus.

(7b) Motor DM is actuated through circuit:

plus—M1u1—M2u1—DM—minus.

As soon as key M is released, relays B4, A2 and A4 are deenergized.

EXAMPLE VII

*Determination of the Check Letters of Alpha-Numerical Group AK59*

(1a) Keys Y and 1 are depressed to enter letter A. Relays E1 and EY are energized.

(1b) Relays S1 and R2 are energized through circuits:

plus—T1u1—T3d1—E4d1—E1u2—E8d2—E0d3—
 E1u3—B1d4—W(S1)—minus;
plus—T1u1—T3d1—E4d1—E1u2—E8d2—E0d3—
 EYu4—A2d5—W(R2)—minus.

(1d) Relays E1 and EY are de-energized. Relays B2, B8, A2 and A4 are energized through circuits:

plus—T1d1—T3u2—S16d2—S2d3—S1u3—S8d3—
 W(B2)—minus;
plus—T1d1—T3u2—S16d2—S2d3—S1u3—S8d3—
 W(B8)—minus;
plus—T1d1—T3u2—R8d2—R1d3—R2u3—R4d2—
 W(A2)—minus;
plus—T1d1—T3u2—R8d2—R1d3—R2u3—R4d2—
 W(A4)—minus.

(1f) Relays S1 and R2 are de-energized.
(2a) Keys X and 4 are depressed to enter letter K. Relays E4, E0 and EY are energized.
(2b) Relays S2, S4, S16, R2 and R8 are energized through circuits:

plus—T1u1—T3d1—E4u1—E8d2—E0u3—EYu3—
 B2u5—W(S2)—minus;
plus—T1u1—T3d1—E4u1—E8d2—E0u3—EYu3—
 B4d5—W(S4)—minus;
plus—T1u1—T3d1—E4u1—E8d2—E0u3—EYu3—
 B4d4—B8u4—W(S16)—minus;
plus—T1u1—T3d1—E4u1—E8d2—E0u3—EYu3—
 E2d5—E1d4—A2u5—W(R2)—minus;
plus—T1u1—T3d1—E4u1—E8d2—E0u3—EYu3—
 E2d5—E1d4—E4d5—A4u5—W(R8)—minus.

(2d) Relays E4, E0, EY and B2 are de-energized. Relays B4, B8 and A2 are energized through circuits:

plus—T1d1—T3u2—S16u2—S2u2—S1d2—S4u3—
 W(B4)—minus;
plus—T1d1—T3u2—S16u2—S2u2—W(B8)—minus;
plus—T1d1—T3u2—R8u2—R1d2—R2u4—R4d4—
 W(A2)—minus.

(2f) Relays S2, S4, S16, R2 and R8 are de-energized.
(3a) Key 5 is depressed to enter digit 5. Relays E1 and E4 are energized.
(3b) Relays S1, S16 and R2 are energized through circuits:

plus—T1u1—T3d1—E4u1—E8d2—E0d3—E1u3—
 B1d4—W(S1)—minus;
plus—T1u1—T3d1—E4u1—E8d2—E0d3—E1u3—
 B1d2—E2d4—E4u3—B4u3—E8d4—B8u4—
 W(S16)—minus;
plus—T1u1—T3d1—E4u1—E8d2—E0d3—EYd4—
 A2u5—W(R2)—minus.

(3d) Relays E1, E4, B4 and B8 are de-energized. Relays B1, A2 and A4 are energized through circuits:

plus—T1d1—T3u2—S16u2—S2d2—S1u5—S4d5—
 W(B1)—minus;
plus—T1d1—T3u2—R8d2—R1d3—R2u3—R4d2—
 W(A2)—minus;
plus—T1d1—T3u2—R8d2—R1d3—R2u3—R4d2—
 W(A4)—minus.

(3f) Relays S1, S16 and R2 are de-energized.
(4a) Key 9 is depressed to enter digit 9. Relays E1 and E8 are energized.
(4b) Relays S2, S8, R2 and R4 are energized through circuits:

plus—T1u1—T3d1—E4d1—E1u2—E8u2—E0d2—
 E1u3—B1u2—E2d3—B2d5—W(S2)—minus;
plus—T1u1—T3d1—E4d1—E1u2—E8u2—E0d2—
 E1u3—B1u2—E2d3—B2d3—E4d3—E8u5—
 B8d5—W(S8)—minus;
plus—T1u1—T3d1—E4d1—E1u2—E8u2—E0d2—
 EYd4—A2u5—W(R2)—minus;
plus—T1u1—T3d1—E4d1—E1u2—E8u2—E0d2—
 EYd4—A4u5—W(R4)—minus.

(4d) Relays E1, E8 and A2 are de-energized. Relays B1, B8 and A4 are energized through circuits:

plus—T1d1—T3u2—S16d2—S2u3—S1d4—S8u4—
 S4d5—W(B1)—minus;
plus—T1d1—T3u2—S16d2—S2u3—S1d4—S8u4—
 W(B8)—minus;
plus T1d1—T3u2—R8d2—R1d3—R2u3—R4u2—
 W(A4)—minus.

(4f) Relays S2, S8, R2 and R4 are de-energized.
(5a) Key C is depressed to read out the result.
Discharge tube DT7 (No. 7 from the left) in FIG. 3 is ignited through circuit:

plus—Cb1—B1u1—B2d2—DT7—B8u3—B4d2—
 Cb2—minus.

The first check letter is S.
Discharge tube DT5 (No. 5 from the left) in FIG. 4 is ignited through circuit:

plus—Cb1—A1d1—DT5—A4u3—A2d2—Cb3—
 minus.

The second check letter is N.
(5b) Relays B1, B8 and A4 are de-energized.

EXAMPLE VIII

*Checking of Group AK59, Accompanied by its Check Letters S and N*

The first four steps are exactly the same as is Example VII.
(5a) Keys Y and 7 are depressed to enter check letter S. Relays E1, E2, E4 and EY are energized.
(5b) Relays S16, R2 and R4 are energized through circuits:

plus—T1u1 — T3d1 — E4u1 — E8d2 — E0d3 —
 E1u3—B1u2—E2u3—E4u2—E8d4—B8u4—
 W(S16)—minus;
plus — T1u1 — T3d1 — E4u1 — E8d2 — E0d3 —
 EYu4—A2d5—W(R2)—minus;
plus — T1u1 — T3d1—E4u1—E8d2—E0d3—EYd4—
 A4u5—W(R4)—minus.

(5d) Relays 1E, E2, E4 and EY are de-energized. Relays B4 and A4 are energized through circuits:

plus — T1d1 — T3u2 — S16u2 — S2d2 — S1d5 —
 W(B4)—minus;
plus — T1d1 — T3u2 — R8d2 — R1d3 — R2u3 —
 R4u2—W(A4)—minus.

(5f) Relays S16, R2 and R4 are de-energized.
(6a) Keys X and 5 are depressed to enter check letter N. Relays E1, E4, E0 and EY are energized.
(6b) Relays S16, R1 and R8 are energized through circuits:

plus — T1u1 — T3d1 — E4u1 — E8d2 — E0u3 —
 EYu3—B4u4—W(S16)—minus;
plus — T1u1 — T3d1 — E4u1 — E8d2 — E0u3 —
 EYu3—E2d5—E1u4—A1d5—W(R1)—minus;
plus — T1u1 — T3d1 — E4u1 — E8d2 — E0u3—
 EYu3 — E2d5 — E1u4 — A1d3 — E4u5 — A4u4 —
 W(R8)—minus.

(6d) Relays E1, E4, E0 and EY are de-energized. Relays B4, A2 and A4 are energized through circuits:

plus — T1d1 — T3u2 — S16d2 — S2d2 — S1d5 —
 W(B4)—minus;
plus — T1d1 — T3u2 — R8u2 — R1u2 — R2d2 —
 R4d2—W(A2)—minus;
plus — T1d1 — T3u2 — R8u2 — R1u2 — R2d2 —
 R4d2—W(A4)—minus.

(6f) Relays S16, R1 and R8 are de-energized.

(7a) Key M is depressed to check the group. Relays M1 and M2 are energized through circuits:

plus — M$b$1 — A1$d$1 — C$a$3 — A2$u$2 — A4$u$2 — M$b$3— W(M1)—minus;

plus — M$b$1 — B1$d$1 — B2$d$2 — C$a$2 — B4$u$2 — B8$d$2 — M$b$2—W(M2)—minus.

(7b) Motor DM is actuated through circuit:

plus—M1$u$1—M2$u$1—DM—minus.

As soon as key M is released, relays B4, A1 and A2 are de-energized.

Although the invention has been described hereinbefore with reference to a specific embodiment thereof, it is to be understood that many alterations and modifications are possible within the scope of the invention as set forth in the appended claims.

I claim:

1. A device for determining check symbols, comprising a plurality of entering members for entering digits and letters; translating means controlled by the said entering members and producing for each symbol entered by means of the same a first symbol value selected from the values from 0 to $(N-1)$, N being a prime number greater than 10, and a second symbol value selected from the values from 0 to $(M-1)$, M being a prime number different from N, and the combination of symbol values being different for each symbol to be entered by means of the said entering members; a first computer for computing the remainder on division by N of the number formed by the first symbol values of the symbols of a symbol group entered by means of the said entering members; a second computer for computing the remainder on division by M of the number formed by the second symbol values of the symbols of said symbol group; means coupled with said first computer for indicating a first check symbol for said symbol group dependent on the remainder computed by said first computer; and means coupled with said second computer for indicating a second check symbol for said symbol group dependent on the remainder computed by said second computer; the said translating means, and the said indicating means coupled with said first computer and the said indicating means coupled with said second computer being arranged in such manner that, for an alphabetical or alphanumerical symbol group completed with said first and second check symbol as indicated by the said indicating means, and for a numerical symbol group complete with said first check symbol only, the number formed by the first symbol values of the symbols of the completed symbol group yields a predetermined constant remainder on division by N, and the number formed by the second symbol values of the symbols of the completed symbol group yields a predetermined constant remainder on division by M.

2. A device as claimed in claim 1, wherein said first computer operates according to the equation $$p_{i+1}=R_N(10p_i+a_i)$$

wherein $p_{i+1}$ is a new check value to be computed after a symbol has been entered, $p_i$ is the previously computed check value, $a_i$ is the first symbol value of the symbol that has been entered, and $R_N$ is an operator denoting that the remainder on division by N of the number in brackets should be taken, and wherein said second computer operates according to the equation $$q_{i+1}=R_M(10q_i+b_i)$$

wherein $q_{i+1}$ is a new check value to be computed after a symbol has been entered, $q_i$ is the previously computed check value, $b_i$ is the second symbol value of the symbol that has been entered, and $R_M$ is an operator denoting that the remainder on division by M of the number in brackets should be taken.

3. A device as claimed in claim 2, wherein the said translating means are arranged in such manner that the first symbol value produced upon entering any digit is equal to the numerical value of said digit, that the second value produced upon entering any letter of a first group of N letters is a constant $b$, and that the first symbol value produced upon entering any letter of a second group of M letters, having one letter in common with said first group, is a constant $d$, and wherein the first check symbols indicated by the said indicating means coupled with said first computer are selected from said first group of letters, and the second check symbols indicated by the said indicating means coupled with said second computers are selected from said second group of letters.

4. A device as claimed in claim 2, wherein said translating means are arranged in such manner that the second symbol value produced upon entering any digit is equal to zero.

5. A device as claimed in claim 2, wherein N is 13 and M is 7.

References Cited in the file of this patent

UNITED STATES PATENTS

| | | |
|---|---|---|
| 2,684,201 | Starreveld et al. | July 20, 1954 |
| 2,754,054 | Helmig et al. | July 10, 1956 |
| 2,765,982 | Knutsen | Oct. 9, 1956 |
| 2,814,439 | Beranger | Nov. 26, 1957 |
| 2,886,240 | Linsman | May 12, 1959 |